| United States Patent [19] | [11] Patent Number: 4,525,558 |
|---|---|
| Takitani et al. | [45] Date of Patent: Jun. 25, 1985 |

[54] CATALYTIC COMPONENT FOR POLYMERIZATION OF α-OLEFIN AND METHOD FOR HOMO- OR CO-POLYMERIZATION OF α-OLEFIN

[75] Inventors: Masaru Takitani; Shizuo Tomiyasu; Keikichi Baba, all of Shinnanyo, Japan

[73] Assignee: Toyo Stauffer Chemical Co., Ltd., Tokyo, Japan

[21] Appl. No.: 573,995

[22] Filed: Jan. 26, 1984

Related U.S. Application Data

[62] Division of Ser. No. 386,585, Jun. 9, 1982, Pat. No. 4,439,539.

[30] Foreign Application Priority Data

Jun. 11, 1981 [JP] Japan ................................. 56-89859

[51] Int. Cl.³ ............................................... C08F 4/44
[52] U.S. Cl. ..................................... 526/142; 526/144; 526/151; 526/907; 526/351
[58] Field of Search ................. 526/142, 144, 125, 73, 526/151

[56] References Cited

U.S. PATENT DOCUMENTS 4,416,799  11/1983  Takitani et al. ...................... 526/142
4,426,314  1/1984  Miyazaki et al. .................. 526/125 X
4,442,225  4/1984  Takitani et al. .................. 526/125 X
4,450,242  5/1984  Mink ................................ 526/125 X Primary Examiner—Joseph L. Schofer
Assistant Examiner—F. Teskin
Attorney, Agent, or Firm—Armstrong, Nikaido, Marmelstein & Kubovcik

[57] ABSTRACT

A Ziegler type supported catalytic component for polymerization of an α-olefin is prepared by allowing an organo-magnesium compound expressed by a generic formula of R'MgX' (wherein R' represents a hydrocarbon group having 1 to 20 carbon atoms and X' either a halogen atom chosen out of chlorine, bromine and iodine or a hydrocarbon group having 1 to 20 carbon atoms) to react with carbon tetrahalide in the presence of an electron donor compound to obtain a solid product through a solid-liquid separation process; by heat treating the separated solid product with a carbon halide; by treating the heat treated solid product with phenols at 90° to 180° C.; and by treating this phenol treated product further with a halogenated titanium compound. Homo- or co-polymerization of an α-olefin is carried out in the presence of a catalyst composition consisting of the above catalytic component and an organoaluminum compound. With this catalytic component, stereospecific polymerization of an α-olefin can be stably carried out at high activity.

2 Claims, No Drawings

CATALYTIC COMPONENT FOR POLYMERIZATION OF α-OLEFIN AND METHOD FOR HOMO- OR CO-POLYMERIZATION OF α-OLEFIN

This is a division of application Ser. No. 386,585, filed June 6, 1982, now U.S. Pat. No. 4,439,539.

BACKGROUND OF THE INVENTION

This invention relates to a novel Ziegler type supported catalytic component for α-olefin polymerization which is of highly uniform particle diameter, of good fluidity and has a high degree of polymerizing activity and high stereospecific polymer productivity (hereinafter will be called the catalytic component for short unless other wise specified) and to a method of carrying out homo- or co-polymerization (hereinafter will be called (co-)polymerization) of an α-olefin in the presence of a catalyst composition consisting of the above stated catalytic component and an organo-aluminum compound.

More particularly, the invention relates to a catalytic component for α-olefin polymerization prepared through steps in which (a) a solid product obtained by allowing an organo-magnesium compound expressed by a generic formula of R'MgX' (wherein R' represents a hydrocarbon group having 1 to 20 carbon atoms and X' either a halogen atom chosen out of chlorine, bromine and iodine or a hydrocarbon group having 1 to 20 carbon atoms) to react with carbon tetrahalide in the presence of an electron donor compound is subjected to a solid-liquid separation process; (b) the separated solid product is heat treated with a carbon halide; (c) the heat treated solid product is treated with phenols at 90° to 180° C. or may be subjected to heating treatment under reduced pressure after this treatment with phenols; and (d) the phenol treated product is treated further with a halogenated titanium compound. The invention also relates to a method for (co-)polymerization of an α-olefin which is carried out either in the presence of a catalyst composition consisting of the catalytic component thus obtained and an organo-aluminum compound or with use of a concomitant electron donor compound together with the catalyst composition.

An important feature of the present invention resides in that the polymer product obtainable in accordance with the invention is great in weight per unit weight of the catalytic component, that is, the catalytic component has a high degree of polymerizing activity. Another important feature resides in that the insufficient bulk density and the insufficient stereospecific polymer productivity which have been the shortcomings of the conventional supported catalytic components of the Ziegler type can be substantially improved. In addition to these important features, it is a further important feature of the invention that stereospecific polymerization of an α-olefin, such as propylene in particular, at a high temperature which has hitherto been extremely difficult is now rendered feasible by the present invention.

Generally, the catalysts which have been used for the manufacture of stereospecific α-olefin polymers are of the type known by the name of a Ziegler-Natta catalyst consisting of a transition metal belonging to the groups IV-VI of the periodic table and an organo-metallic compound of a metal belonging to the groups I-III of the periodic table.

Catalytic components that have been employed in the industrial manufacture of α-olefin polymers such as propylene, butene-1, etc. are catalytic components having titanium trichloride as main constituent, such as an α-olefin polymerizing catalytic component prepared by activating, through a pulverizing process or the like, an eutectic mixture consisting of aluminum chloride and titanium trichloride obtained by reducing titanium tetrachloride with metal aluminum as the compound of the transition metal belonging to the groups IV-VI of the periodic table; and an α-olefin polymerizing catalytic component prepared through a process in which titanium trichloride obtained by reducing titanium tetrachloride with an organo-aluminum compound is activated through treatment carried out with an organo-ether compound and titanium tetrachloride. Generally, these catalytic components are used in combination with an organo-aluminum compound in a catalytic composition for polymerization of an α-olefin.

However, the α-olefin polymer obtained by carrying out polymerization in the presence of such a catalytic composition contains several hundred ppm of residue of the catalyst therein. In such catalytic residue, the transition metal such as titanium accelerates the deterioration of the polymer. Therefore, it is necessary to remove such catalytic residue as much as possible. In an α-olefin manufacturing plant, at present, the catalytic residue is, therefore, being removed by washing the polymer product with alcohols.

To lower the cost of manufacture of an α-olefin polymer, there have recently been proposed many catalytic components prepared to enhance their polymerizing activity to such a high degree that permits omission of a deashing step otherwise required for washing and removing a transition metal such as titanium from the polymer product during an α-olefin polymerization process. In deed, if it is possible to have the polymer produced to an amount of about one hundred thousand to several hundred thousand parts by weight per unit weight of the transition metal such as titanium, the amount of the residual transition metal such as titanium remaining in the polymer product could be held at several ppm or less. Then, the acceleration of deterioration of the polymer product due to the transition metal would become negligible to permit omission of the deashing step, so that the cost of manufacture of the α-olefin can be reduced as desired.

Most of these catalytic components of the prior art are of the Ziegler type and have been prepared in such a manner that a magnesium chloride, either with its surface treated by some method or without any surface treatment, is used as carrier to have titanium tetrachloride supported by the surface thereof. The catalytic component manufacturing methods of the prior art using magnesium chloride as start material and as carrier, however, necessitate a pulverizing process for pulverizing and activating the magnesium chloride. The powdery magnesium chloride obtained through the pulverizing process is in a crashed state which not only lacks homogeneity in particle diameter but also includes a great amount of fine powder. Therefore, both the catalytic component thus obtained from the use of such magnesium chloride and the polymer obtained from the catalytic component have been very poor in morphology such as fluidity.

Meanwhile, there also have recently been proposed many catalytic components of improved particle properties which are obtained by using an organo-magnesium compound as start material in the preparation of a carrier. Typical examples of methods for obtaining such catalytic components include a method disclosed by Japanese Patent Applicaton Laid-Open No. 54-123594 in which a complex consisting of an organo-magnesium compound and an organo-aluminum compound is allowed to react with a tertiary alkyl halide and then a product thus obtained is treated with carboxylic acid ester and titanium tetrachloride; a method disclosed by Japanese Patent Application Laid-Open No. 54-133584 in which a solid product obtained through a reaction between an organo-magnesium compound and an organic halide is treated with an electron donor compound and then is arranged to support titanium tetrachloride; a method disclosed by Japanese Patent Application Laid-Open No. 54-76492 in which a reaction product obtained from a reaction between an organo-magnesium compound and a polyhydric alcohol is treated with an electron donor compound and then is arranged to support a titanium tetrachloride; methods disclosed by Japanese Patent Application Laid-Open No. 53-43094 and Japanese Patent Application Laid-Open No. 54-107987 in which a carrier obtained by allowing a silicon tetrachloride to react with a reaction product obtained from a reaction between an organo-magnesium compound and a hydropolysiloxane or a carrier obtained by allowing silicon tetrachloride to react directly with an organo-magnesium compound is processed to support titanium tetra-chloride; a method disclosed by Japanese Patent Application Laid-Open No. 55-58207 in which a solid product obtained through a reaction between an organo-magnesium compound and silicon tetrachloride is treated with an alcohol and carboxylic acid ester and then is treated further with titanium tetrachloride; and a method disclosed by Japanese Patent Application Laid-Open No. 55-133408 in which a solid organo-magnesium compound is treated with an aromatic alcohol and an electron donor compound and then is treated further with titanium tetrachloride.

However, catalytic components obtained in accordance with these prior art methods either do not have a sufficiently high degree of polymerizing activity or, even if they have a high degree of polymerizing activity, have a low degree of stereospecific polymer productivity or have such other shortcomings that: Their polymerizing activity is high at the initial stage of polymerization but comes to quickly lower thereafter or gives a polymer product of low bulk density. These shortcomings seem to have been preventing them from becoming acceptable for practical applications.

Another shortcoming of the prior art catalytic supported components of the Ziegler type resides in their polymerizing properties at high temperature. The higher the polymerizing activity of the catalytic component is, the greater the momentary chlorific value will be. Therefore, even if the temperature control over the whole inside of a reactor is possible, it is nearly impossible to prevent local over-heating. A catalytic component of high polymerizing activity is therefore required to be capable of retaining its performance even when an α-olefin polymerizing process is carried out at high temperature.

Meanwhile, for simplification of an α-olefin polymerizing process, studies for polymerization of an α-olefin in a gas phase have recently been actively conducted. The gas phase polymerization process is to be carried out at a high temperature for polymerization of an α-olefin. Gas phase polymerization of propylene, for example, is generally carried out at a high degree of temperature exceeding 90° C. With the prior art catalytic components, however, the polymerization temperature is generally 60° to 70° C. or 80° C. at the most. Polymerization at temperature exceeding 80° C. with the prior art catalytic components results in a conspicuous decrease in the productivity for a stereospecific polymer. The catalytic components of the prior art are thus not usable for polymerization of propylene at high temperature. In the case of a gas phase polymerization apparatus using a fluidized bed, the particle diameter of the catalytic component must be highly uniform. Whereas, a catalytic component obtained through a pulverization process is not uniform in particle diameter and contains a great amount of fine powder of the catalytic component. Therefore, such a catalytic component is hardly usable for the polymerization process. In view of this, it has been desired to have a catalytic component that has highly uniform particle diameter as well as a polymerizing property suitable for high temperature in the field of gas-phase polymerization of an α-olefin.

The present inventors strenuously conducted studies for elimination of the above stated shortcomings of the catalytic components of the Ziegler type of the prior art having titanium supported by a carrier. These studies have resulted in the completion of the present invention.

SUMMARY OF THE INVENTION

It is an object of the invention to provide a catalytic component prepared through essential steps including (a) a step in which an organo-magnesium compound expressed by a generic formula of R'MgX' (wherein R' represents a hydrocarbon group having 1 to 20 carbon atoms and X' either a halogen atom chosen out of chlorine, bromine and iodine or a hydrocarbon group having 1 to 20 carbon atoms) is allowed to react with carbon tetrahalide in the presence of an electron donor compound to obtain a solid product through a solid-liquid separation process; (b) a step in which the separated solid is heat treated with a carbon halide; (c) a step in which the heat treated solid product is treated with phenols at 90° to 180° C. or may be further subjected to a heating treatment under reduced pressure after this treatment with phenols; and (d) a step in which the phenol treated product is treated further with a halogenated titanium compound.

It is another object of the invention to provide a method for (co-)polymerization of an α-olefin in which the polymerization is carried out either in the presence of a catalyst composition consisting of the catalytic component prepared according to the invention and an organo-aluminum compound or with use of a concomitant electron donor compound together with the above stated catalyst composition.

Features of the process for the preparation of the catalytic component according to the present invention include: The reaction of the organo-magnesium compound and the carbon tetrahalide is carried out in the presence of an electron donor compound. The solid product obtained through the solid-liquid separation process is heat treated with a carbon halide. The heat treated solid product is treated with phenols at a temperature between 90° and 180° C. After that, the phenol treated solid may be subjected to the heating treatment carried out under reduced pressure. And then the solid is further treated with a halogen containing titanium compound. These steps are essential conditions for the invented catalytic component. The essential conditions result in the following advantages: The catalytic component and a polymer obtainable therefrom excel in morphology. The former excels in polymerizing activity and stereospecific polymer productivity. The poor bulk density of polymers obtained from the conventional Ziegler type supported catalytic components can be substantially improved by the invention. A further and wonderful advantage of the invention lies in that: The stereospecific polymerization of an α-olefin which has been extremely difficult at a high temperature now can be carried out in accordance with the invention. For example, the invented catalytic component permits stereospecific polymerization of propylene at a temperature exceeding 90° C. Therefore, stereospecific polymerization of an α-olefin can be stably carried out even with the catalytic component of the Ziegler type. Besides, the invention has made gas-phase polymerization of an α-olefin feasible.

The objects, features and advantages of the invention will become apparent from the following detailed description thereof.

DETAILED DESCRIPTION OF THE INVENTION

The electron donor compound usable in accordance with the invention is selected from the group consisting of organic acid esters, organic ether compounds, polysiloxanes, thioethers, ketones and amines, and is usable either singly or in the form of a mixture of two or more kinds of them.

Taking aliphatic carboxylic acid esters and aromatic carboxylic acid esters as specific examples of the organic acid esters, the aliphatic carboxylic acid ester may be selected from the group consisting of a primary alkyl ester of saturated fatty acid such as methyl formate, ethyl acetate, n-amyl acetate, 2-ethyl-hexyl acetate, n-butyl formate, ethyl butyrate, ethyl valerate, etc.; an alkenyl ester of saturated fatty acid such as vinyl acetate, allyl acetate, etc.; a primary alkylester of unsaturated fatty acid such as methyl acrylate, methyl methacrylate, n-butyl crotonate, etc.; a polybasic carboxylic acid ester such as 2-ethyl-hexyl adipate, etc.; a lactone such as γ-butyro lactone, δ-valero lactone, etc.; in the case of aromatic carboxylic acid esters, a primary alkyl ester of benzoic acid such as methyl benzoate, ethyl benzoate, n-propyl benzoate, n- or iso-butyl benzoate, n- or iso-amyl benzoate, n-hexyl benzoate, n-octyl benzoate, 2-ethyl-hexyl benzoate, etc.; a primary alkyl ester of toluic acid such as methyl toluate, ethyl toluate, n- or iso-butyl toluate, acid 2-ethyl-hexyl toluate, etc.; a primary alkyl ester of anisic acid such as methyl anisate, ethyl anisate, n-propyl anisate, etc.; a primary alkyl ester of naphthoic acid such as methyl naphthoate, ethyl naphthoate, n-propyl naphthoate, n-butyl naphthoate, 2-ethyl-hexyl naphthoate, etc.; an aromatic lactone such as cumarin, phthalide, etc.; and so on. Among these esters, use of methyl benzoate, ethyl benzoate, methyl toluate, ethyl toluate, ethyl anisate, methyl naphthoate and ethyl naphthoate is preferable.

The organic ether compound that can be used as electron donor in accordance with the invention is a compound having an ether bond expressed by a generic formula of $R^2OR^3$ (wherein $R^2$ and $R^3$ represent either the same or different hydrocarbon groups each having 1 to 15 carbon atoms) or a polyether having at least two of such ether bonds within the same molecule or a cyclic ether forming a ring within the ether molecule thereof. More specifically, the organic ether compound may be selected from the group consisting of an aliphatic ether such as ethyl ether, propyl ether, iso-propyl ether, butyl ether, iso-butyl ether, amyl ether, iso-amyl ether, hexyl ether, octyl ether, decyl ether, dodecyl ether, methyl propyl ether, methyl iso-propyl ether, methyl butyl ether, methyl iso-butyl ether, methyl amyl ether, methyl iso-amyl ether, methyl hexyl ether, ethyl propyl ether, ethyl iso-propyl ether, ethyl butyl ether, ethyl iso-butyl ether, ethyl amyl ether, ethyl iso-amyl ether, ethyl hexyl ether, vinyl ether, allyl ether, methyl allyl ether, ethyl vinyl ether, ethyl allyl ether, butyl vinyl ether, etc.; an aromatic ether such as phenetole, butyl phenyl ether, amyl phenyl ether, methoxy toluene, benzyl ethyl ether, phenyl ether, benzyl ether, phenyl benzyl ether, naphthyl ether, veratrol, etc.; a cyclic ether such as propylene oxide, trimethylene oxide, epoxy butane, dioxane, trioxane, furan, methyl furan, tetrahydrofuran, tetrahydropyrane, cineole, etc.; and a polyether such as dimethoxy ethane, diethoxy ethane, dibutoxy ethane, diethylene glycol dimethyl ether, diethylene glycol diethyl ether, diethylene glycol dibutyl ether, methylal, acetal, glycerol ether, crown ether, etc.

The polysiloxane usable as electron donor in accordance with the invention is either a siloxane polymer having a repeating unit expressed by the generic formula of

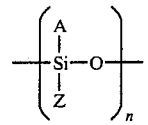

(wherein A and Z represent groups bindable to silicon such as hydrogen, an alkyl group of carbon number 1 to 8, an aryl group of carbon number not exceeding 10, a halogen, an alkoxyl group of carbon number 1 to 8, an aryloxy group of carbon number not exceeding 10 or an aliphatic acid residual group of carbon number not exceeding 20; and n represents a number between 3 and 10000) or a siloxane polymer having two or more kinds of the above stated repeating units distributed in various ratios within the molecule thereof. More specifically, the polysiloxane may be selected from the group consisting of organic polysiloxanes including, for example, an alkyl siloxane polymer such as octa-methyl tri-siloxane, octa-ethyl-cyclo-tetra-siloxane, di-methyl polysiloxane, methylethylpolysiloxane, etc.; an aryl siloxane polymer such as hexaphenylcyclotrisiloxane, diphenylpolysiloxane, etc.; an alkaryl siloxane polymer such as diphenylhexamethyltetrasiloxane, methylphenylpolysiloxane, etc.; a haloalkylsiloxane such as 1,5-dichlorohexamethyltrisiloxane, 1,7-dichlorooctamethyltetrasiloxane, etc.; an alkoxysiloxane polymer such as dimethoxypolysiloxane, diethoxypolysiloxane, etc.; and an aryloxy siloxane polymer such as diphenoxypolysiloxane, etc.

The thioether usable as electron donor in accordance with the present invention is a compound expressed by the generic formula of $R^4SR^5$ (wherein $R^4$ and $R^5$ respectively represent hydrocarbon groups of carbon number 1 to 20). More specifically, the thioether may be selected from the group consisting of diethylthioether, di-n-propylthioether, di-n-butylthioether, di-n-amylthioether, di-n-hexylthioether, di-n-octylthioether, di-n-decylthioether, methylphenylthioether, ethylphenylthioether, diphenylthioether, ditolylthioether, dibenzylthioether, diallylthioether, allylphenylthioether, etc.

The organic ketone usable as electron donor in accordance with the invention is a compound expressed by the generic formula of $R^6COR^7$ (wherein $R^6$ and $R^7$ respectively represent hydrocarbon groups). The hydrocarbon group is, for example, an alkyl group of carbon number 1 to 15, such as methyl, ethyl, propyl, butyl, octyl, etc., or an aryl group of carbon number not exceeding 15, such as phenyl, tolyl, xylyl, etc., or an aralkyl group of carbon number not exceeding 15, such as benzyl. More specifically, the organic ketone may be selected from the group consisting of an aliphatic ketone such as acetone, methylethylketone, dibutylketone, dipentylketone, dioctylketone, etc.; and an aromatic ketone such as acetophenone, benzophenone, etc.

The amine usable as electron donor in accordance with the invention is a compound expressed by the generic formula of

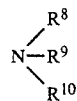

(wherein $R^8$ represents a hydrocarbon group and $R^9$ and $R^{10}$ respectively represent either hydrogen or hydrocarbon groups). Examples of such hydrocarbon groups include an alkyl group of carbon number 1 to 15, such as methyl, ethyl, butyl, propyl, octyl, etc.; an aryl group of carbon number not exceeding 15, such as phenyl, tolyl, xylyl, etc.; and an aralkyl group of carbon number not exceeding 15, such as benzyl. More specifically, the amine may be selected from the group consisting of an aliphatic primary, secondary or tertiary amine such as diethylamine, triethylamine, n-propylamine, di-n-propylamine, tri-n-propylamine, n-butylamine, di-n-butylamine, tri-n-butylamine, n-octylamine, di-n-octylamine, tri-n-octylamine, etc.; and an aromatic primary, secondary or tertiary amine such as aniline, N-methylaniline, N,N-dimethylaniline, diphenylamine, triphenylamine, N,N-dimethylbenzylamine, etc. In addition to these amines, a compound having at least two nitrogen atoms of amine in the molecule thereof, such as tetramethylmethylenediamine, ethylenediamine, tetramethylethylenediamine, tetraethylethylenediamine, etc. is also usable for the purpose of the invention.

The quantity in which the electron donor compound is to be used varies with the kind of the donor compound. Generally, however, the electron donor is used in quantity at least 0.001 mol, preferably more than 0.01 and more preferably 0.1 mol or more to 1 mol of the organo-magnesium compound. Use of the electron donor compound in quantity less than 0.001 mol hardly gives a usable catalytic component because of low stereospecific polymer productivity of the catalytic component thus obtained. Although there is no particular upper limit to the quantity of the donor, use of more than 20 mol of it does not give any salient increase in the effect thereof. It is, therefore, preferable to use the electron donor in quantity not exceeding 20 mol.

The organo-magnesium compound usable in accordance with the invention is expressed by the generic formula of $R'MgX'$ (wherein $R'$ represents a hydrocarbon group having 1 to 20 carbon atoms and $X'$ either a halogen atom chosen out of chlorine, bromine and iodine or a hydrocarbon group having 1 to 20 carbon atoms). The organo-magnesium compound may be selected from the group consisting of diethylmagnesium, di-n-propylmagnesium, diisopropylmagnesium, diisoamylmagnesium, isoamylethylmagnesium, isoamyl-n-propylmagnesium, di-n-amylmagnesium, di-n-amylmagnesium, n-amyl-n-propylmagnesium, n-butyl-t-butylmagnesium, n-butylpropylmagnesium, dibutenylmagnesium, di-n-butylmagnesium, n-butylethylmagnesium, n-butyl-sec-butylmagnesium, di-t-butylmagnesium, di-sec-butylmagnesium, dicyclopentadienylmagnesium, di-n-hexylmagnesium, n-hexylethylmagnesium, bis(methylcyclopentadienyl)magnesium, dihexynylmagnesium, dicyclohexylmagnesium, dibenzylmagnesium, bis(phenylethyl)magnesium, dicinamylmagnesium, n-octylethylmagnesium, di-n-octylmagnesium, di-n-decylmagnesium, methylmagnesium chloride, methylmagnesium bromide, methylmagnesium iodide, ethynylenemagnesium bromide, vinylmagnesium chloride, vinylmagnesium bromide, ethylmagnesium chloride, ethylmagnesium bromide, ethylmagnesium iodide, allylmagnesium chloride, prophenylmagnesium bromide, isopropenylmagnesium bromide, n-propylmagnesium chloride, n-propylmagnesium bromide, isopropylmagnesium chloride, isopropylmagnesium bromide, 1-methylpropenylmagnesium bromide, tetramethylenemagnesium dibromide, t-butylmagnesium chloride, n-butylmagnesium chloride, sec-butylmagnesium chloride, cyclopentadienylmagnesium chloride, cyclopentadienylmagnesium bromide, p-phenylenemagnesium dibromide, phenylmagnesium chloride, phenylmagnesium bromide, styryl magnesium chloride, styryl magnesium bromide, 1-methyl-2,2-diphenylcyclopropylmagnesium bromide, amylmagnesium chloride, hexylmagnesium chloride, benzylmagnesium chloride, octylmagnesium chloride, decylmagnesium chloride, etc. Among these organo-magnesium compounds, use of n-butylethylmagnesium, n-hexylethylmagnesium, di-n-hexylmagnesium, n-octylethylmagnesium, di-n-butylmagnesium, di-n-octylmagnesium, ethylmagnesium chloride, n-butylmagnesium chloride, n-hexylmagnesium chloride or n-octylmagnesium chloride is preferable in respect to ease of use.

In accordance with the invention, the organo-magnesium compound is rendered soluble by a solvent selected from the group consisting of an aliphatic hydrocarbon such as hexane, heptane, kerosine, etc.; an alicyclic hydrocarbon such as cyclohexane, methylcyclohexane, etc.; an aromatic hydrocarbon such as benzene, toluene, xylene, etc.; one of the above stated organo-ether compounds; one of the above stated amines; and a mixture of them. The organo-magnesium compound is thus used in a state of solution.

Next, the carbon tetrahalide usable in accordance with the invention is chosen out of carbon tetrafluoride, carbon tetrachloride, carbon tetrabromide and carbon tetraiodide. However, use of carbon tetrachloride is preferable in respect to economy, ease of handling and catalytic properties obtainable.

In accordance with the invention, the organo-magnesium compound is allowed to react with the carbon tetrahalide by mixing them in the presence of the electron donor compound. This mixing may be carried out by adding the carbon tetrahalide to the organo-magnesium compound, and vice versa, or the two may be simultaneously added and mixed together. However, since organo-magnesium compounds are generally viscous matter though their viscosity varies with the kind and concentration thereof, it is preferable to add, with stirring, the carbon tetrahalide to a solvent in which the organo-magnesium has been dissolved with the carbon tetrahalide either having been diluted with a hydrocarbon or without such dilution. The concentration of the organo-magnesium compound in a solvent varies with the structure of the organo-magnesium compound expressed by the generic formula of R'MgX' as well as with the number of carbon atoms and the kind of the halogen atom in R' and X'. However, the concentration of the organo-magnesium compound in the solvent is less than 50 wt %, preferably less than 45 wt % and more preferably less than 40 wt %. Since the organo-magnesium compound is viscous as mentioned above, concentration thereof exceeding 50 wt % causes the solvent in which it is dissolved to become too viscous for easy operations such as stirring, etc. Meanwhile, there is no specific lower limit to the concentration. Taking the productivity of the catalytic component into consideration, however, the concentration of the organo-magnesium compound is preferably at least 0.1 wt %.

Further, the electron donor compound is preferably added to the solvent in which the organo-magnesium compound has been dissolved. In an alternative, the organo-magnesium compound are allowed to react with the electron donor compound, before the organo-magnesium is mixed with the carbon tetrahalide, by dissolving the organo-magnesium compound in the electron donor compound and then by diluting the solution with a solvent.

The carbon tetrahalide is used for the purpose of replacing the hydrocarbon group of the organo-magnesium compound with halogen atoms. The quantity of the carbon tetrahalide is 0.01 to 10 mol per mol of the hydrocarbon group of the organo-magnesium compound, preferably 0.05 to 5 mol and more preferably 0.1 to 3 mol.

As for the temperature at which the reaction of the organo-magnesium and the carbon tetrahalide is to be carried out, there is no specific limitation. However, since the reaction vigorously takes place at high temperature, the reaction is preferably carried out at a relatively low temperature at which the reaction proceeds not too slowly. In view of this, the reaction temperature is set between $-50°$ and $100°$ C., preferably between $-30°$ and $80°$ C. and more preferably between $-20°$ and $50°$ C. To ensure that the reaction is completely carried out, it is preferable, though it depends on the reaction temperature, to have a stirring and mixing operation further continued over an additional period of 0.1 to 10 hours at the same temperature or with the temperature raised from the reaction temperature within a range not exceeding $150°$ C.

A solid product obtained through this reaction is subjected to a solid-liquid separation process and thus separated from the reaction system by a suitable method such as decantation, filtration or centrifugal separation. The solid product thus separated is preferably washed with a hydrocarbon solvent selected from the group consisting of hexane, heptane, kerosine, cyclohexane, methylcyclohexane, benzene, toluene, xylene, etc.

Then, the separated solid product is subjected to a heating treatment with a carbon halide.

The carbon halide usable in accordance with the invention is a compound expressed by a generic formula of $CmX^2_{2M+2}$ (wherein $X^2$ represents a halogen atom chosen out of chlorine, bromine and iodine and n an integral number of $1 \leq m \leq 10$). More specific examples of the carbon halide include carbon tetrachloride, carbon tetrabromide, carbon tetraiodide, hexachloroethane, hexabromoethane, hexaiodoethane, octachloropropane. Among these carbon halides, use of carbon tetrachloride or hexachloroethane is preferable.

The solid product is suspended in the carbon halide either in the presence of a hydrocarbon solvent (1 to 99 vol %) or in the absence thereof. Under this condition, the solid product is subjected to a heating treatment which is carried out at a temperature between $40°$ and $80°$ C., preferably between $50°$ and $80°$ C. and more preferably between $60°$ and $80°$ C. over a period of 0.1 to 10 hours. The quantity of the carbon halide to be used must be at least 0.1 mol per mol of magnesium contained in the solid product. Quantity less than 0.1 mol would not give any effect of the use of carbon halide. The purpose of this heating treatment is to enhance the polymerization activity of the catalytic component. When the treatment with phenols which will be described in detail below is carried out without this heating treatment carried out beforehand, the catalytic component thus obtained has a low degree of polymerizing activity.

The treatment of the heat treated solid product with phenols is preferably carried out in a solvent of one or more kinds of hydrocarbon selected from the group consisting of an aliphatic hydrocarbon such as heptane, octane, decane, kerosine, etc.; an alicyclic hydrocarbon such as methylcyclohexane, cycloheptane, decalin, etc.; and an aromatic hydrocarbon such as toluene, xylene, tetralin, etc. This treatment is generally carried out in the following manner: The solid reaction product is suspended in the hydrocarbon solvent and then the phenol is added either without diluting it or by diluting it with a hydrocarbon to an extent between 1 vol % and 100 vol %.

The phenol usable in accordance with the invention is selected from the group consisting of phenol, cresol, xylenol, n phthol, butylhydroxytoluene, chlorophenol, bromophenol, 2,4,6-tri-chlorophenol, 2,4,6-tri-bromophenol, nitrophenol, 2,4-dinitrophenol, guaiacol, anol, eugenol, isoeugenol, saligenin, carvacrol, thymol, hydroxyacetophenone, hydroxydiphenyl, cyclohexylphenol, catechol, resorcin, hydroquinone, pyrogallol, hydroxyhydroquinone, phloroglucinol, aminophenol, etc.

The length of time required for the treatment to be carried out with the phenol varies with the treating temperature and the kind of the phenol used and thus not particularly limited. However, the preferred length of time for the treatment is between 0.1 and 10 hours. A length of time less than 0.1 hour will not give any effect of the treatment. Conversely, treatment over a period exceeding 10 hours will not give any salient increase in the attainable effect. Meanwhile, the temperature at which the treatment is to be carried out is an important factor in accordance with the invention and is set between $90°$ and $180°$ C. and preferably between $95°$ and $150°$ C. Treatment at a temperature below $90°$ C. tends to result in lower catalytic properties. However, treatment at a temperature above $180°$ C. will not give any salient increases in the effect.

The quantity of the phenol to be used for the treatment is generally set between 0.01 to 10 mol, preferably between 0.05 and 5 mol and most preferably between 0.1 and 3 mol per mol of magnesium contained in the above stated heat treated solid product. The effect of the treatment carried out with the phenol appears chiefly in the polymerizing activity and the stereospecific polymer productivity at the time of polymerization of an α-olefin. In the case of catalytic components obtained without this treatment, the polymerizing activity and the stereospecific polymer productivity tend to become lower and particularly the latter becomes low.

After the solid product has been thus treated with the phenol, the product (hereinafter will be called the phenol treated product) is treated with a halogenated titanium compound. In carrying out this treatment, the phenol treated product may be subjected to the treatment with the halogenated titanium compound without any preparatory process. However, the phenol treated product may be dried by heating under reduced pressure before the treatment with the halogenated titanium compound. Hereinafter the solid product which has been dried by heating under reduced pressure will be called the dried product. The drying process by heating under reduced pressure is carried out at pressure not exceeding 500 mmHg in absolute pressure, at a temperature between 10° and 100° C., and over a period of 1 to 10 hours. Through this drying process, the catalytic properties such as polymerizing activity, etc. can be further improved.

The treatment with the halogenated titanium compound can be carried out in accordance with a known method. For example, the treatment may be carried out by allowing the phenol treated product to be suspended either in the halogenated titanium compound or in a hydrocarbon solvent in which the halogenated titanium compound is dissolved. In the latter case, however, it is preferable to have a high concentration of the halogenated titanium compound. Further, this treatment may be carried out with concomitance of a known electron donor compound there.

The halogenated titanium compound that is usable in accordance with the invention is a compound expressed by the generic formula of $Ti(OR'')_n X^3_{4-n}$ (wherein $R''$ represents a hydrocarbon group having 1 to 15 carbon atoms, $X^3$ a halogen atom chosen out of chlorine, bromine and iodine and n a real number of $0 \leq n \leq 3$) and may be selected from the group consisting of titanium tetrachloride, titanium tetrabromide, titanium tetraiodide, ethoxytitanium trichloride, propoxytitanium trichloride, butoxytitanium trichloride, dibutoxytitanium dichloride, tributoxytitanium monochloride, etc. Among these compounds, however, use of titanium tetrachloride is most preferable. The quantity of the halogenated titanium compound to be used for the treatment against 1 mol of magnesium contained in the phenol treated product or the dried product is at least 0.01 mol, preferably 1.0 or more and more preferably 10 mol or more. Normally, this treatment is carried out over a period of 0.1 to 10 hours at a temperature between room temperature and 150° C. After completion of the treatment, a solid-liquid separating process is carried out either by decantation or filtration. Then, the halogenated titanium compound etc. sticking to the surface of the solid thus obtained are washed off with a hydrocarbon such as hexane, heptane, kerosine, cyclohexane, methylcyclohexane, benzene, toluene, xylene, etc. A catalytic component is obtained thus in a slurry like state in the hydrocarbon or in a dried state after drying.

The catalytic component obtained through these processes described above is of uniform particle diameter and of good fluidity.

The catalytic component according to the invention can be used for the (co-) polymerization of an α-olefin in combination with an organo-aluminum compound.

The organo-aluminum compound to be used for this purpose is a compound expressed by the generic formula of $AlR'^{12}_l X^4_{3-l}$ (wherein $R^{12}$ represents a hydrocarbon group of carbon number 1 to 20; $X^4$ either a halogen atom chosen out of fluorine, chlorine, bromine and iodine or a hydrogen atom; and l a real number of $0 < l \leq 3$). More specifically, the organo-aluminum compound is selected from the group consisting of trimethylaluminum, triethylaluminum, tri-n-propylaluminum, tri-n-butylaluminum, triisobutylaluminum, tri-n-hexylaluminum, tri-2-methylpentylaluminum, tri-n-octylaluminum, tri-n-decylaluminum, diethylaluminum chloride, di-n-propylaluminum chloride, diisobutylaluminum chloride, methylaluminum sesquichloride, ethylaluminum sesquichloride, ethylaluminum dichloride, isobutylaluminum dichloride, diethylaluminum fluoride, diethylaluminum bromide, diethylaluminum iodide, diethylaluminum hydride, diisobutyl aluminum hydride, isoprenylaluminum, etc. Each of these organo-aluminum compound is usable either singly or in a state of a mixture of two or more kinds.

The addition quantity of the organo-aluminum compound per mol of the titanium contained in the catalytic component, as reduced to the mol number of aluminum contained in the organo-aluminum compound, Al/Ti, is preferably between 1 and 1000.

For further improvement in the catalytic properties, etc., in accordance with the invention, a known electron donor compound may be allowed to be concomitant in carrying out the polymerization. The known electron donor may be selected out of the electron donor compounds mentioned in the foregoing.

The quantity of the electron donor compound to be used per mol of the organo-aluminum compound for this purpose is 0.01 to 3 mol, preferably 0.05 to 2 mol and more preferably 0.1 to 1 mol.

The (co-) polymerization may be carried out by one of various processes including: A suspension polymerization process using a solvent which is selected from the group consisting of an aromatic hydrocarbon such as benzene, toluene, xylene, etc.; an aliphatic hydrocarbon such as hexane, heptane, octane, kerosine, etc.; and an alicyclic hydrocarbon such as cyclohexane, methylcyclohexane, etc. A liquid phase polymerization process using a liquefied α-olefin as solvent. A gas phase polymerization process in which an α-olefin is polymerized in a vapor phase. As for the mode of carrying out the (co-) polymerization, it may be carried out either in a continuous mode or in a batch mode.

The α-olefin that can be (co-) polymerized by using the invented catalytic component is an organic compound expressed by a generic formula of $CH_2=CHR^{13}$ (wherein $R^{13}$ represents either hydrogen or a hydrocarbon group having 1 to 6 carbon atoms). Such organic compounds include, for example, ethylene, propylene, butene-1, 4-methylpentene-1, hexene-1, styrene, etc. The molecular weight adjustment for the (co-) polymerization of such an α-olefin can be accomplished by a known method using hydrogen or diethyl zinc. The (co-) polymerization is carried out preferably at a temperature within a range from 40° to 120° C. and under pressure between normal pressure and 100 atm and more preferably between normal pressure and 60 atm.

The polymer obtainable in accordance with the present invention is highly homogeneous in particle diameter, of high bulk density and excels in morphology. Therefore, it can be marketed as it is without going through any pelletizing process.

The invention will be more clearly understood with reference to the following description of examples, in which: The polymerizing activity is indicated by a symbol A, a heptane insoluble matter by H.I., an isotactic index by I.I. and bulk density by $\rho B$. The definition of these terms are:

A: The weight (g) of a solid polymer produced per unit time (hr), unit pressure (atm) and unit weight (g) of the catalytic component, that is: (g-polymer/g-catalytic component-hr-atm)

H.I.: A polymer insoluble in n-heptane (g)×100/solid polymer (g)—(%)

I.I.: A polymer insoluble in n-heptane (g)×100/total polymer produced (g)—(%)

$\rho B$: Bulk density (g/ml) of solid polymer produced as measured in accordance with the Method A of ASTM-D-1895-69

Ti: Content of titanium contained in the catalytic component (wt %)

EXAMPLE 1

1. Preparation of the Catalytic Component

1-1. Reaction of Organo-magnesium Compound and Carbon Tetrachloride

Using n-butylethylmagnesium as the organo-magnesium compound according to the invention, 161 ml of an n-heptane solution of the n-butylethylmagnesium manufactured by Texas Alkyls Inc. of U.S.A., at concentration of 0.65 mol/liter) was poured into a 300 ml, four necked flask the inside of which had been replaced with dry nitrogen. The flask was then immersed in a refrigerant to cool the solution down to 0° C. To the cooled solution was added 2.0 ml of ethyl benzoate with stirring (the addition quantity of the ethyl benzoate was equivalent to 0.134 mol per mol of the n-butylethylmagnesium). Following this, 25 ml of carbon tetrachloride which had been diluted with 75 ml of n-heptane was dropped into the flask (the addition quantity of the carbon tetrachloride was equivalent to 2.55 mol per mol of the n-butylethylmagnesium). After dropping of the carbon tetrachloride, the solution was continuously stirred and kept at 0° C. for 40 minutes, at normal temperature for 40 minutes and at 80° C. for 60 minutes to obtain a solid product.

After that, the solution was allowed to cool down to normal temperature and then the stirring operation was stopped to allow the solid product to precipitate. Then, a supernatant liquid was removed by decantation. After the decantation, 200 ml of n-heptane was again poured into the flask and stirring, precipitation and decantation processes were respectively repeated five times to wash the solid product.

1-2. Heating Treatment with Carbon Halide

Using carbon tetrachloride as the carbon halide, 200 ml of the carbon tetrachloride was poured into the flask to have the above stated solid product suspended therein. This suspension was kept at 80° C. and heat treated over a period of 2 hours. Stirring was stopped. The solid was allowed to precipitate. A supernatant was removed by decantation. After that, 200 ml of n-heptane was poured into the flask. Stirring, precipitation and decantation processes were respectively repeated five times to wash the heat treated solid.

1-3. Treatment with Phenol

Into the above stated flask, was poured 100 ml of kerosine to have the above stated solid product suspended therein. While keeping the suspension at 30° C. under a stirring operation, 100 ml of a kerosine solution in which 5 g of p-cresol was dissolved as the phenol was dropped into the suspension. Under a stirring operation, the temperature of the suspension was raised up to 100° C. and the suspension was thus treated at 100° C. over a period of 2 hours. Then, the suspension was allowed to cool down. Stirring was stopped to allow the solid to precipitate. A supernatant was removed by decantation. Following this, 200 ml of n-heptane is poured into the flask. Then, stirring, precipitation and decantation were repeated five times to wash the treated solid.

1-4. Treatment with Titanium Tetrachloride

This treatment was carried out by pouring the phenol treated solid product and 80 ml of titanium tetrachloride into a 100 ml, four necked flask which was equipped with a stirrer and the inside of which had been replaced with dry nitrogen. Under a stirring operation, and in an oil bath, temperature was raised up to 140° C. The treatment was carried out at 140° C. over a period of 2 hours. After that, the treated matter was allowed to cool. After cooling, a cake was obtained through filtration. The cake was washed with 1 liter of n-heptane and dried at 40° C. under reduced pressure over a period of 5 hours to obtain 10 g of a catalytic component.

The catalytic component thus obtained consisted of highly uniform particles which measured $40\mu$ in mean particle diameter. The results of composition analysis indicated that the titanium content Ti of the catalytic component was 2.9%.

2. Polymerization of Propylene

2-1. Low Pressure Polymerization (Polymerization Method A)

Inside of a 1 liter flask was replaced with dry nitrogen. Then, 400 ml of n-heptane, 0.5 ml of triethyl aluminum, 0.1 ml of diethylaluminum chloride and 0.16 ml of ethyl p-anisate were put into the flask. After that, 0.1 g of the above stated catalytic component was put into the flask.

The inside temperature of the flask was raised up to 70° C. Following this, the flask was shook and stirred and, at the same time, propylene gas was introduced to the inside of the flask to a pressure value of 2 kg/cm²G to begin the polymerization of propylene. With the inside temperature and the inside pressure of the flask respectively kept at temperature 70° C. and pressure 2 kg/cm²G, the polymerization of propylene was carried out over a period of 2.5 hours.

Upon completion of the polymerization, the stirring operation and the propylene gas supplying operation were stopped. Propylene gas remaining inside of the flask was exhausted to the outside of the reaction system. After that, the catalytic component was decomposed by pouring into the flask a mixture liquid consisting of methyl alcohol and isopropyl alcohol. A polymer slurry thus obtained within the flask was filtered to obtain a solid polymer. At the same time, the filtrate was evaporated to recover a polymer of low molecular weight dissolved in the filtrate. The results of the polymerization were as shown in Table 1. Further the I.I. of the polymerization was 94.2%.

2-2. High Pressure Polymerization (Polymerization Method B)

The inside of a 5 liter autoclave was replaced with dry nitrogen. Into this autoclave were put 40 mg of the above stated catalytic component, 0.5 ml of triethylaluminum, 0.1 ml of diethylaluminum chloride and 0.16 ml of ethyl p-anisate. Next, hydrogen was introduced into the autoclave until there obtained 0.4 kg/cm$^2$G of hydrogen pressure. Following this, 1.5 kg of liquid propylene was put into the autoclave with pressure.

The inside temperature of the autoclave was raised up to 80° C. by heating. When this temperature was reached, stirring was commenced and the polymerization was considered to began at this point of time. With the inside temperature of the autoclave kept at 80° C., polymerization of propylene was carried out over a period of 2 hours. After that, stirring was stopped. Propylene gas was removed from the reaction system to obtain a solid polymer. The results of the polymerization were as shown in Table 1.

COMPARISON EXAMPLE 1

A catalytic component was prepared in exactly the same manner as in Example 1 with the exception of that the heating treatment with the carbon halide which was carried out in Example 1 was omitted in this case. Then, using this catalytic component, propylene was polymerized in accordance with the polymerization method B as described in Example 1. The results of the polymerization were as shown in Table 1.

COMPARISON EXAMPLE 2

A catalytic component was prepared in exactly the same manner as in Example 1 with the exception of that the treatment with the phenol was carried out at 80° C. in this case. Then, using this catalytic component, propylene was polymerized in accordance with the polymerization method B as described in Example 1. The results of the polymerization were as shown in Table 1.

COMPARISON EXAMPLE 3

A catalytic component was prepared in exactly the same manner as in Comparison Example 1 with the exception of that the treatment with the phenol was carried out at 80° C. in this case. Polymerization of propylene was carried out by using the catalytic component in accordance with the polymerization method B as described in Example 1. The results of this were as shown in Table 1.

EXAMPLE 2

The inside of a flask which was of capacity 500 ml and was equipped with a dropping funnel and a water cooling reflux condenser was replaced with dry nitrogen. Then, 14.6 g (0.6 mol) of metal magnesium powder of 100 to 200 mesh, 363 ml of n-heptane and small pieces of iodine were put into the flask. The temperature of the flask was raised up to 95° C. Next, a mixture of 0.5 mol of n-butyl chloride and 0.5 mol of di-n-butylether was measured and put in the dropping funnel and then was dropped with stirring at 90° to 100° C. over a period of 2 hours. After completion of the dropping process, the stirring operation was further continued at 90° to 100° C. over a period of 4 hours. Then, the stirring was stopped and a supernatant thus obtained was taken out within nitrogen. The supernatant liquid was analyzed to find that the liquid was a heptane solution of an organomagnesium butylether coordinated compound of structure expressed by n-BuMgCl. The organo-metal concentration in the liquid was 0.73 mol/liter.

In preparing a catalytic component, 143 ml of the above stated n-heptane solution of the n-butylmagnesium chloride-butylether coordination compound was employed as organo-magnesium compound. With the exception of that, the catalytic component was prepared in exactly the same manner as in Example 1 and propylene was polymerized in accordance with the polymerization method B. The results of the polymerization were as shown in Table 1.

EXAMPLE 3

In preparing a catalytic component, 0.105 mol/liter of the n-heptane solution of the ethylmagnesium chloride-ethylether coordination compound obtained in accordance with the method of Example 2 was employed as organo-magnesium compound. With the exception of that, the catalytic component was prepared in exactly the same manner as in Example 2. Using this catalytic component, propylene was polymerized in accordance with the polymerization method B. The results of the polymerization were as shown in Table 1.

EXAMPLE 4

In preparing a catalytic component, 161 ml of an n-heptane solution of di-n-hexylmagnesium (concentration: 0.65 mol/liter) was employed as organo-magnesium compound. With the exception of this, the catalytic component was prepared in exactly the same manner as in Example 1 and propylene was polymerized in accordance with the polymerization method B. The results thus obtained were as shown in Table 1.

EXAMPLE 5

In preparing a catalytic component, 75 ml of an n-butylether solution of n-butylmagnesium chloride (concentration: 1.4 mol/liter) was employed as organo-magnesium compound. With the exception of this, the catalytic component was prepared in exactly the same manner as in Example 1 and propylene was polymerized in accordance with the polymerization method B. The results thus obtained were as shown in Table 1.

EXAMPLE 6

In carrying out heating treatment with a carbon halide, 200 ml of a mixture solution of carbon tetrachloride and n-heptane (in vol. ratio of 1:4) was employed as carbon halide. With the exception of this, a catalytic component was prepared in exactly the same manner as in Example 1 and propylene was polymerized in accordance with the polymerization method B. The results thus obtained were as shown in Table 1.

EXAMPLE 7

In carrying out heating treatment with a carbon halide, 200 ml of a mixture solution of carbon tetrachloride and n-heptane, in vol. ratio of 1:9, was employed as the carbon halide. With the exception of this, a catalytic component was prepared in exactly the same manner as in Example 1 and propylene was polymerized in accordance with the polymerization method B. The results thus obtained were as shown in Table 1.

EXAMPLE 8

In carrying out heating treatment with a carbon halide, a solution obtained by dissolving 20 g of hexachloroethane in 200 ml of n-heptane was employed as the carbon halide. With the exception of this, a catalytic component was prepared in exactly the same manner as in Example 1 and, using this catalytic component, propylene was polymerized in accordance with the polymerization method B. The results thus obtained were as shown in Table 1.

EXAMPLES 9 and 10 and COMPARISON EXAMPLE 4

In each of these examples, heating treatment with a carbon halide was carried out at a temperature of 60° C. (Example 9), 40° C. (Example 10) or 20° C. (Comparison Example 4). With the exception of this, a catalytic component was prepared in exactly the same manner as in Example 1 and, using this catalytic component, propylene was polymerized in accordance with the polymerization method B. The results thus obtained were as shown in Table 1.

EXAMPLE 11

In carrying out treatment with phenols, 3.8 g of phenol was used while n-heptane was used as solvent for the treatment. The treatment was carried out at a temperature of 90° C. With the exception of this treatment, a catalytic component was prepared in exactly the same manner as in Example 1. Then, using this catalytic component, propylene was polymerized in accordance with the polymerization method B. The results thus obtained were as shown in Table 1.

EXAMPLE 12

In carrying out treatment with phenols, 2.5 g of catechol was employed as the phenol and the treatment temperature was set at 110° C. With the exception of this, a catalytic component was prepared in exactly the same manner as in Example 1 and propylene was polymerized in accordance with the polymerization method B. The results of the polymerization were as shown in Table 1.

EXAMPLE 13

The treatment with phenols was carried out with 2.0 g of resorcin used as the phenol, with mixed xylene used as solvent and with the treatment temperature set at 120° C. With the exception of this, a catalytic component was prepared in exactly the same manner as in Example 1 and propylene was polymerized in accordance with the polymerization method B. The results thus obtained were as shown in Table 1.

EXAMPLE 14

The treatment with phenols was carried out with 6.5 g of p-chlorophenol used as the phenol, with mixed xylene used as solvent and with the treatment temperature set at 110° C. With the exception of this treatment, a catalytic component was prepared in exactly the same manner as in Example 1 and propylene was polymerized in accordance with the polymerization method B. The results thus obtained were as shown in Table 1.

EXAMPLE 15

The treatment with phenols was carried out with 6.0 g of 2,4-dimethylphenol used as the phenol and with the treatment temperature set at 130° C. With the exception of this treatment, a catalytic component was prepared in exactly the same manner as in Example 1 and propylene was polymerized in accordance with the polymerization method B. The results thus obtained were as shown in Table 1.

EXAMPLES 16–20

In carrying out a reaction between an organo-magnesium compound and carbon tetrachloride, 2.0 ml of ethyl benzoate which was used as concomitant electron donor compound in Example 1 was replaced by varied various electron donor compounds in varied quanties as shown in Table 2. With the exception of this, a catalytic component was prepared in each of Examples 16 through 20 in exactly the same manner as in Example 1. In each of these examples, propylene was polymerized in accordance with the polymerization method B except that the quantity of the catalyst used for the polymerization was varied as shown in Table 2. The results thus obtained were as shown also in Table 2.

TABLE 1

| Example and Comparison Example No. | A (g/g-hr-atm) | H.I. (%) | $\rho$B (g/ml) |
| --- | --- | --- | --- |
| Example 1 (polymerization method A) | 520 | 95.8 | 0.41 |
| Example 1 (polymerization method B) | 563 | 94.6 | 0.42 |
| Comparison Example 1 | 365 | 93.5 | 0.40 |
| Comparison Example 2 | 331 | 92.6 | 0.39 |
| Comparsion Example 3 | 215 | 92.4 | 0.38 |
| Example 2 | 572 | 94.1 | 0.43 |
| Example 3 | 538 | 93.7 | 0.40 |
| Example 4 | 558 | 94.2 | 0.42 |
| Example 5 | 542 | 94.7 | 0.43 |
| Example 6 | 560 | 94.5 | 0.42 |
| Example 7 | 547 | 94.0 | 0.41 |
| Example 8 | 559 | 94.2 | 0.42 |
| Example 9 | 542 | 94.1 | 0.41 |
| Example 10 | 463 | 93.2 | 0.40 |
| Comparison Example 4 | 280 | 92.6 | 0.38 |
| Example 11 | 523 | 93.8 | 0.40 |
| Example 12 | 582 | 95.0 | 0.43 |
| Example 13 | 567 | 94.2 | 0.44 |
| Example 14 | 548 | 93.9 | 0.41 |
| Example 15 | 575 | 95.1 | 0.45 |

TABLE 2

| Example No. | Electron donor com'd | Qty of electron donor (ml) | A (g/g-hr-atm) | H.I. (%) | $\rho$B (g/ml) | Polymerizing catalyst | | | |
| --- | --- | --- | --- | --- | --- | --- | --- | --- | --- |
| | | | | | | Qty of catalytic component (mg) | TEAL (ml) | DEAC (ml) | EPA (ml) |
| 16 | EPT | 2.5 | 572 | 94.4 | 0.41 | 40 | 0.5 | 0.2 | 0.14 |
| 17 | EPA | 6.0 | 538 | 95.1 | 0.43 | 40 | 0.3 | 0.1 | 0.14 |
| 18 | EE | 10.0 | 545 | 94.7 | 0.44 | 40 | 0.5 | 0.1 | 0.12 |
| 19 | NBE | 21.4 | 593 | 93.9 | 0.44 | 40 | 0.8 | 0.3 | 0.16 |

TABLE 2-continued

| Example No. | Electron donor com'd | Qty of electron donor (ml) | A (g/g-hr-atm) | H.I. (%) | pB (g/ml) | Polymerizing catalyst | | | |
|---|---|---|---|---|---|---|---|---|---|
| | | | | | | Qty of catalytic component (mg) | TEAL (ml) | DEAC (ml) | EPA (ml) |
| 20 | NOE | 80.0 | 584 | 94.2 | 0.42 | 40 | 0.3 | 0.2 | 0.14 |

NOTES
EPT: ethyl p-toluate
EPA: ethyl p-anisate
EE: ethylether
NBE: n-butylether
NOE: n-octylether
TEAL: triethylaluminum
DEAC: diethylaluminum chloride

EXAMPLE 21

In preparing a catalytic component according to the invention, 143 ml of an n-heptane solution of the n-butylmagnesium chloride-butylether coordination compound (concentration: 0.73 mol/liter) obtained in Example 2 was poured into a 300 ml, four necked flask, the inside of which had been replaced with dry nitrogen. The flask was then immersed in a refrigerant to have the solution cooled down to 0° C. Under a stirring operation, 25 ml of carbon tetrachloride which had been diluted with 75 ml of n-heptane was dropped into the solution. After dropping, the solution was kept at 0° C. for 40 minutes, at room temperature for 40 minutes and at 80° C. for 60 minutes with continuous stirring to obtain a solid product. With the exception of that, the catalytic component was prepared in exactly the same manner as in Example 1. Then, using this catalytic component, propylene was polymerized in accordance with the polymerization method B. The results thus obtained were as shown in Table 3.

EXAMPLE 22

A catalytic component was prepared in exactly the same manner as in Example 21 with the exception of that 0.105 mol of an n-heptane solution of an ethylmagnesium chloride-ethylether coordination compound was used in place of the 143 ml of the n-heptane solution of the n-butylmagnesium chloride-butylether coordination compound used in Example 21. Then, using the catalytic component, propylene was polymerized in accordance with the polymerization method B. The results thus obtained were as shown in Table 3.

EXAMPLE 23

A catalytic component was prepared in exactly the same manner as in Example 21 with the exception of that 75 ml of an n-butylether solution of n-butylmagnesium chloride (concentration: 1.4 mol/liter) was used in place of the 143 ml of the n-heptane solution of the n-butylmagnesium chloride-butylether coordination compound used in Example 21. Using this catalytic component, propylene was polymerized in accordance with the polymerization method B. The results thus obtained were as shown in Table 3.

EXAMPLE 24

In preparing a catalytic component, 30 ml of n-butylether was used in place of 2.0 ml of the ethyl benzoate used in Example 4. With the exception of that, the catalytic component was prepared in exactly the same manner as in Example 4. Using this catalytic component, propylene was polymerized in accordance with the polymerization method B. The results thus obtained were as shown in Table 3.

EXAMPLE 25

In preparing a catalytic component, heating treatment with a carbon halide was carried out by using a solution obtained by dissolving 20 g of hexachloroethan in 200 ml of n-heptane as the carbon halide. With the exception of that, the catalytic component was prepared in exactly the same manner as in Example 19. Then, using this catalytic component, propylene was polymerized in accordance with the polymerization method B. The results thus obtained were as shown in Table 3.

EXAMPLE 26

In preparing a catalytic component, treatment with titanium tetrachloride was carried out by using 80 ml of a mixed solution of titanium tetrachloride and kerosine (in vol. ratio of 1:1) in place of 80 ml of the titanium tetrachloride used in Example 19. With the exception of that, the catalytic component was prepared in exactly the same manner as in Example 19. Then, using the catalytic component, propylene was polymerized in accordance with the polymerization method B. The resuls thus obtained were as shown in Table 3.

TABLE 3

| Example No. | A (g/g-hr-atm) | H.I. (%) | pB (g/ml) |
|---|---|---|---|
| 21 | 569 | 94.5 | 0.42 |
| 22 | 532 | 93.7 | 0.41 |
| 23 | 547 | 93.9 | 0.40 |
| 24 | 597 | 94.3 | 0.42 |
| 25 | 563 | 93.8 | 0.43 |
| 26 | 565 | 93.5 | 0.42 |

EXAMPLES 27–35

Catalytic components were prepared in exactly the same manner as in Examples 1, 2, 5, 8, 12, 19, 21, 23 and 25 with the exception of that, after the treatment was carried out with phenols, the phenol treated solids were respectively dried at 50° C. over a period of 3 hours under reduced pressure of 50 mmHg in absolute pressure in Examples 27–35. Then, using each of these catalytic components, propylene was polymerized in accordance with the polymerization method B. The results thus obtained were as shown in Table 4.

TABLE 4

| Example No. | Preparation of catalytic component | A (g/g-hr-atm) | H.I. (%) | pB (g/ml) |
|---|---|---|---|---|
| 27 | Based on Example 1 | 565 | 96.8 | 0.42 |
| 28 | Based on Example 2 | 572 | 96.2 | 0.43 |
| 29 | Based on Example 5 | 548 | 96.9 | 0.43 |

TABLE 4-continued

| Example No. | Preparation of catalytic component | A (g/g-hr-atm) | H.I. (%) | ρB (g/ml) |
|---|---|---|---|---|
| 30 | Based on Example 8 | 560 | 96.1 | 0.42 |
| 31 | Based on Example 12 | 585 | 97.2 | 0.43 |
| 32 | Based on Example 19 | 598 | 96.2 | 0.44 |
| 33 | Based on Example 21 | 563 | 96.3 | 0.42 |
| 34 | Based on Example 23 | 547 | 96.0 | 0.40 |
| 35 | Based on Example 25 | 568 | 96.2 | 0.42 |

EXAMPLES 36–53

Using catalytic components prepared in accordance with the methods shown in Table 5, propylene was polymerized in accordance with the polymerization method B with the exception of that the polymerizing temperature was set at 90° C. in each of Example 36–53. The results thus obtained were as shown in Table 5.

TABLE 5

| Example No. | Catalytic components were prepared in accordance with | A (g/g-hr-atm) | H.I. (%) | ρB (g/ml) |
|---|---|---|---|---|
| 36 | Example 1 | 620 | 94.6 | 0.42 |
| 37 | Example 2 | 630 | 94.0 | 0.43 |
| 38 | Example 5 | 597 | 94.7 | 0.43 |
| 39 | Example 8 | 615 | 94.2 | 0.42 |
| 40 | Example 12 | 641 | 93.7 | 0.41 |
| 41 | Example 19 | 653 | 93.8 | 0.44 |
| 42 | Example 21 | 630 | 94.4 | 0.42 |
| 43 | Example 23 | 602 | 94.0 | 0.40 |
| 44 | Example 25 | 620 | 93.8 | 0.43 |
| 45 | Example 27 | 622 | 96.8 | 0.42 |
| 46 | Example 28 | 632 | 96.1 | 0.43 |
| 47 | Example 29 | 604 | 96.9 | 0.43 |
| 48 | Example 30 | 617 | 96.0 | 0.42 |
| 49 | Example 31 | 644 | 97.2 | 0.43 |
| 50 | Example 32 | 658 | 96.3 | 0.44 |
| 51 | Example 33 | 620 | 96.3 | 0.42 |
| 52 | Example 34 | 602 | 96.0 | 0.40 |
| 53 | Example 35 | 625 | 96.2 | 0.41 |

EXAMPLE 54

The inside of a 5 liter autoclave was replaced with dry nitrogen. Then, 2 liters of dry n-heptane was poured into the autoclave. Following this, 40 mg of the catalytic component obtained in Example 1, 0.3 ml of triethylaluminum, 0.2 ml of diethylaluminum chloride and 0.14 ml of ethyl p-anisate were put into the autoclave. After that, hydrogen was introduced into the autoclave to an extent of 0.4 kg/cm²G in hydrogen pressure. Upon completion of introduction of hydrogen, the autoclave was heated up to 70° C. while the inside of the autoclave was kept stirred.

When the inside temperature of the autoclave reached 70° C. propylene gas with 5.2 vol % of ethylene mixed therein was forced with pressure into the autoclave to an extent of 10 kg/cm²G. Copolymerization of ethylene and propylene was thus carried out. The supply of the mixed gas of ethylene and propylene was stopped when 2 hours had lapsed after the commencement of the polymerization process. The mixed gas remaining within the autoclave was removed. Then, isopropyl alcohol was poured into the autoclave to decompose the catalytic component.

A slurry of the copolymer of ethylene and propylene thus obtained was filtered. A cake thus obtained was dried to obtain a solid polymer and, at the same time, the filtrate was evaporated to recover a polymer of low molecular weight dissolved in the filtrate. The results thus obtained were: A=624, I.I.=87.2 and ρB=0.37.

Further, ethylene content in the polymer thus obtained was 7.4%.

COMPARISON EXAMPLE 5

First, 161 ml of the n-heptane solution of n-butylethylmagnesium obtained in Example 1 was poured into a 300 ml, four necked flask which was equipped with a stirrer and had the inside thereof replaced with dry nitrogen. Then, 25 ml of carbon tetrachloride which had been diluted with 75 ml of n-heptane was dropped into the flask at room temperature. After dropping of the carbon tetrachloride, the solution was kept stirred while the solution was maintained at room temperature for 80 minutes and then at 80° C. for 60 minutes to obtain a solid product. Next, the solution was allowed to cool down to normal temperature. After that, stirring was stopped to allow the solid product to precipitate. A supernatant liquid was removed by decantation. Again 200 ml of n-heptane was poured into the flask. Stirring, precipitation and decantation processes were respectively repeated five times to wash the solid product.

After washing, 100 ml of kerosine was poured into the flask to have the solid product suspended therein. Under a stirring operation, the suspension was kept at 30° C. while 100 ml of a kerosine solution in which 5 g of p-cresol and 2.0 ml of ethyl benzoate was dissolved, was dropped into the flask. The temperature of the solution was raised up to 60° C. with stirring to carry out treatment at 60° C. over a period of 2 hours. The solution was then allowed to cool down. Stirring was stopped to allow the solid to precipitate. A resultant supernatant liquid was removed by decantation. Following that, 200 ml of n-heptane was poured into the flask. Stirring, precipitation and decantation processes were repeated five times to wash the treated solid.

Using a 100 ml, four necked flask which was equipped with a stirrer and the inside thereof had been replaced with dry nitrogen, the above stated treated solid and 80 ml of titanium tetrachloride were poured into the flask. The temperature of the flask was raised up to 140° C. with stirring in an oil bath and treatment was thus carried out at 140° C. over a period of 2 hours.

After treatment, the solution was allowed to cool down and filtered. A cake thus obtained was washed with 1 liter of n-heptane and then was dried at 40° C. for 5 hours under reduced pressure to obtain a catalytic component. Using this catalytic component, propylene was polymerized in accordance with the polymerization method B. The results thus obtained were: A=218, H.I.=90.3 and ρB=0.34.

What is claimed is:

1. A method for homo- or co-polymerization of an α-olefin wherein the polymerization is carried out in the presence of a catalytic composition comprising an α-olefin polymerizing catalytic component and an organo-aluminum compound, said catalytic component being prepared through sequential steps including:
    (a) a step in which an organo-magnesium compound expressed by the generic formula of R'MgX' (wherein R' represents a hydrocarbon group having 1 to 20 carbon atoms and wherein X' is either halogen atoms chosen out of chlorine, bromine and iodine or is R' is reacted with carbon tetrahalide in the presence of an electron donor compound to obtain a solid-liquid product which is subjected to a solid-liquid separation process at a temperature between −50° C. and 100° C. to separate the solid from the solid-liquid separation product;
(b) a step in which the separated solid is heat treated with a carbon halide at a temperature between 40° and 80° C., the amount of the carbon halide is at least 0.1 mol per mol of magnesium contained in the solid product;
(c) a step in which the heat treated solid product of step (b) is treated with phenols at a temperature between 90° C. and 180° C., the amount of the phenols used is 0.01 to 10 mol per mol of magnesium contained in the heat treated solid product of step (b); and
(d) another step in which the phenol treated product is treated further with a halogenated titanium compound at a temperature between room temperature and 150° C., the amount of the halogenated titanium compound used is at least 0.01 mol per mol of the magnesium contained in the phenol treated product.

2. A method for homo- or co-polymerization of an α-olefin wherein the polymerization is carried out in the presence of a catalytic composition comprising an α-olefin polymerizating catalytic component and an organo-aluminum compound, said catalytic component being prepared through sequential steps including
(a) a step in which an organo-magnesium compound expressed by the generic formula of R'MgX' (wherein R' represents a hydrocarbon group having 1 to 20 carbon atoms and wherein X' is either halogen atoms chosen out of chlorine, bromine and iodine or is R' is reacted with carbon tetrahalide in the presence of an electron donor compound to obtain a solid-liquid product which is subjected to a solid-liquid separation process at a temperature between −50° C. and 100° C. to separate the solid from the solid-liquid separation product;
(b) a step in which the separated solid is heat treated with a carbon halide at a temperature between 40° and 80° C., the amount of the carbon halide is at least 0.1 mol per mol of magnesium contained in the solid product;
(c) a step in which the heat treated solid product of step (b) is treated with phenols at a temperature between 90° C. and 180° C., the amount of the phenols used is 0.01 to 10 mol per mol of magnesium contained in the heat treated solid product of step (b);
(d) a step in which said phenol treated solid product is dried by heating at a temperature between 10° C. and 100° C. under reduced pressure; and
(e) another step in which the solid product dried under reduced pressure is treated further with a halogenated titanium compound at a temperature between room temperature and 150° C., the amount of halogenated titanium compound used is at least 0.01 mol per mol of magnesium contained in the heat treated solid product.

* * * * *